United States Patent [19]

Sato et al.

[11] Patent Number: 4,692,236

[45] Date of Patent: Sep. 8, 1987

[54] CATALYTIC CRACKING PROCESS FOR HEAVY OIL WITH MIXTURE OF ALUMINA AND ZEOLITE

[75] Inventors: Goro Sato; Masamitsu Ogata; Tatsuo Masuda; Takanori Ida, all of Kitakyushu, Japan

[73] Assignee: Catalysts & Chemicals Industries Co., Inc., Tokyo, Japan

[21] Appl. No.: 777,891

[22] Filed: Sep. 19, 1985

[30] Foreign Application Priority Data

Sep. 25, 1984 [JP] Japan ............................... 59-199733
Nov. 27, 1984 [JP] Japan ............................... 59-250787

[51] Int. Cl.⁴ ...................... C10G 11/05; C10G 25/09
[52] U.S. Cl. .................................. 208/114; 208/120; 208/253
[58] Field of Search ................ 208/114, 120, 52 CT, 208/251 R, 253

[56] References Cited

U.S. PATENT DOCUMENTS

| | | | |
|---|---|---|---|
| 3,342,750 | 9/1967 | Kearby | 208/114 X |
| 4,121,996 | 10/1978 | Hilfman | 208/111 |
| 4,151,119 | 4/1979 | Gladrow | 208/120 X |
| 4,179,358 | 12/1979 | Swift et al. | 208/114 |
| 4,192,736 | 3/1980 | Kluksdahl | 208/251 H |
| 4,243,556 | 1/1981 | Blanton, Jr. | 208/120 X |
| 4,259,212 | 3/1981 | Gladrow et al. | 208/120 X |
| 4,289,605 | 9/1981 | Bartholic | 208/113 |
| 4,292,169 | 9/1981 | Gladrow | 208/120 |
| 4,321,128 | 3/1982 | Yoo | 208/114 |
| 4,465,588 | 8/1984 | Occelli et al. | 208/120 |
| 4,486,298 | 12/1984 | Bowes et al. | 208/253 |
| 4,513,090 | 4/1985 | Eberly, Jr. et al. | 502/66 |
| 4,549,958 | 10/1985 | Beck et al. | 208/253 |
| 4,576,709 | 3/1986 | Miller et al. | 208/57 |
| 4,584,091 | 4/1986 | Pine | 208/114 |

*Primary Examiner*—Olik Chadhuri
*Attorney, Agent, or Firm*—Flynn, Thiel, Boutell & Tanis

[57] ABSTRACT

In a catalytic cracking process for heavy oil which comprises contacting a heavy oil with a particulate mixture of a crystalline aluminosilicate-containing cracking catalyst particle and an alumina particle and/or a phosphorus-containing alumina particle mixed in the weight ratio of 80/20–20/80, under cracking conditions, metal contaminants contained in said feed oil are captured preferentially by said alumina particle and/or a phosporous-containing alumina particle, and the coexistent cracking catalyst is poisoned only to a reduced degree by metal contaminants.

11 Claims, No Drawings

CATALYTIC CRACKING PROCESS FOR HEAVY OIL WITH MIXTURE OF ALUMINA AND ZEOLITE

BACKGROUND OF THE INVENTION

The present invention relates to a catalytic cracking process for heavy oil, in more detail relates to a process for catalytic cracking a low-grade heavy oil containing large amounts of metals such as vanadium, nickel, iron and the like in the presence of a mixture of crystalline aluminosilicate-containing cracking catalyst particles and alumina particles.

The catalytic cracking process for hydrocarbon oil aiming at the production of gasoline has customarily been carried out by using a cracking catalyst which comprises dispersing a crystalline aluminosilicate zeolite in a matrix. This catalytic cracking process has obtained good results seemingly, so far as the hydrocarbon oil containing relatively small amounts of metal contaminants is used as feed oil, even though said feed oil is a heavy oil. However, petroleum conditions have recently gotten worse to bring about a critical situation that a low-grade heavy oil containing large amounts of metals such as vanadium, nickel, iron and the like per se must be subjected to catalytic cracking. So far as said low-grade heavy oil is treated, the usual catalytic cracking process as aforesaid does not necessarily achieve good results.

That is, when the low-grade heavy oil containing large amounts of metal contaminants is treated by using the usual crystalline aluminosilicate-containing cracking catalyst, not only the cracking activity of the catalyst is harmed due to metal deposit but also contaminants increase for promoting dehydrogenation, whereby hydrogen and coke increase and thus the yield of gasoline lowers. And, as the amounts of metals deposited on the catalyst increase, there is even a possibility that the crystalline aluminosilicate zeolite gives rise to crystal breaking and the cracking activity is further deteriorated.

In view of this, as the measures for catalytic cracking of the heavy oil containing large amounts of metals there have usually been employed the process which comprises increasing the amount of cracking catalyst usage in order to lower the amounts of metals deposited on each catalyst particle; or comprises mixing the used cracking catalyst whose amounts of metals deposited are relatively small; and further the process which comprises adding an antimony compound to the feed oil in order to prevent the activity of the cracking catalyst from lowering due to metal deposit. However, these usual processes are not necessarily praiseworthy because the operating cost is expensive. And, it is not preferable to increase the content of crystalline aluminosilicate zeolite in the catalyst for the purpose of increasing the cracking activity, because it leads to promotion of by-production of coke and gaseous components and reduction of the gasoline yield.

SUMMARY OF THE INVENTION

The present invention provides a process which is capable of catalytic cracking even a low-grade heavy oil containing large amounts of metals, by using a novel measure different from those employed in the usual processes and while maintaining a high yield of gasoline, and is based on a new finding that on catalytic cracking of the low-grade heavy oil containing large amounts of metals, when the usual cracking catalyst is added with the alumina particle, the metal contaminants in the feed oil are captured preferentially by said alumina particle and the degree of the cracking catalyst coexisting with the alumina particle being poisoned by metal contaminants is reduced exceedingly. Further, our inventors have found that when incorporating a phosphorus component in the alumina particle, the dehydrogenating activity of metals captured by the alumina particle is retarded, and consequently the coke make and the production of by-products and dry gas are reduced.

Accordingly, the present invention provides, in one embodiment, a catalytic cracking process for heavy oil which comprises contacting a heavy oil with a particulate mixture of a crystalline aluminosilcate-containing cracking catalyst particle and an alumina particle in the weight ratio of 80/20–20/80, under the cracking condition.

The present invention provides, in another embodiment, a catalytic cracking process for heavy oil which comprises contacting a heavy oil with a particulate mixture of a crystalline aluminosilicate-containing cracking catalyst particle and a phosphorus-containing alumina particle in the weight ratio of 80/20–20/80, under the cracking condition.

DETAILED DESCRIPTION

As the crystalline aluminosilicate-containing cracking catalyst particles used in the present invention, there may be enumerated various hitherto used cracking catalyst particles which comprise dispersing crystalline aluminosilicate zeolites in the matrixes formed of porous inorganic oxides, and may be enumerated most commonly catalyst particles which comprise dispersing ammonium ion-exchanged or rare earth-exchanged faujasite in silica or silica-alumina. In the case of the hitherto used catalyst, the amount of the crystalline aluminosilicate zeolite dispersed in the matrix is about 10–50 wt%, more commonly about 20–40 wt%. In the case of the present invention which uses an alumina particle together with a cracking catalyst particle, it is preferable to adjust the amount of the crystalline aluminosilicate zeolite in the cracking catalyst beforehand, taking the mixing ratio of both (which will be referred to afterwards) into consideration, so that the amount of the crystalline aluminosilicate zeolite may become 10–50 wt%, preferably 20–40 wt%, on the basis of the mixture of the cracking catalyst particle and the alumina particle (irrespective of whether it contains a phosphorus component or not).

The alumina particle used together with the cracking catalyst may be a commercially available active alumina usable as a fluid catalyst, but it is preferable that its average particle diameter and bulk density are in the same degree with those of the concurrently used cracking catalyst (irrespective of whether it contains a phosphorus component or not). In this sense, it is proper that the alumina particle to be used in the present invention should have an average particle diameter in the range of 20–80 $\mu$, preferably 40–70$\mu$, and a bulk density in range of 0.60–1.20 g/ml. And, it is preferable that said alumina particle should have an oil absorption of at least 0.2 cc/g. The alumina particle like this can be readily obtained, for instance, by the steps of preparing an alumina hydrate by virtue of the neutralization reaction between an aqueous sodium aluminate solution and an aqueous aluminum sulfate solution; removing a by-product salt from said hydrate by washing; thereafter peptizing the alumina hydrate with an acid in case of necessity; then spray-drying same; and thereafter calcining. And, the particle obtained by calcining the aluminum hydroxide having an average particle diameter 20–80μ obtained by Bayer's process is also suitable as the alumina particle of the present invention, and this particle is profitable in that its production cost is cheap.

On the occasion of incorporating the phosphorus component in the alumina particle, there is employable a process of impregnating the alumina particle with an aqueous solution of a phosphorus compound such as phosphoric acid, phosphate or the like. The amount of the phosphorus component contained in the alumina particle preferably should be regulated so that the atomic ratio of P/Al of a finally obtained phosphorus-containing alumina particle may be in the range of 0.01–0.14. In case the P/Al atomic ratio of the phosphorus-containing alumina particle is 0.01 or less, the effect of the phosphorus can not be displayed, while in case the P/Al atomic ratio is 0.14 or more, the pore volume of the phosphorus containing alumina decreases, the oil absorption lowers, and the bulk density becomes larger than that of the cracking catalyst. Therefore, both cases are not desirable. In the preparation of the phosphorus-containing alumina particle, if the commercially available alumina particle is not used and the alumina particle per se must be prepared, it is applicable to impregnate the calcined alumina particle with the phosphorus component, but it is rather profitable to impregnate the alumina particle before calcination because only one calcination is enough.

In the present invention, it is necessary that the mixing ratio of the cracking catalyst particle to the alumina particle should be in the range of 80/20–20/80 in terms of weight ratio, irrespective of whether the alumina particle contains a phosphorus component or not. When the amount of the alumina particle is less than this range, the metal contaminants in the feed oil can not be captured well preferentially by the alumina particle, and contrarily when the amount of the cracking catalyst is less than this range, as a matter of course the cracking activity lowers and thus catalytic cracking of the feed oil can not be effected sufficiently. Accordingly, in the practice of the process of the present invention it is preferable that when the amount of metal contaminants contained in the feed oil is considered to be large, the percentage of the alumina particle in the mixture of the cracking catalyst and the alumina particle should be increased and lowering of the cracking activity to be caused by the relative decrease of the amount of the cracking catalyst should be compensated by increasing the amount of the crystalline aluminosilicate zeolite dispersed in the cracking catalyst.

Of course, the particulate mixture may be composed of three kinds of particles, namely cracking catalyst particles, phosphorus component-free alumina particles and phosphorus-containing alumina particles.

As the cracking conditions, there may be employed also in the present invention those which have hitherto been employed in the prior art. The typical cracking conditions like these can be enumerated as follows: reaction temperature 460°–540° C., WHSV 4–20 $hr^{-1}$, cat/oil ratio 4–12.

It is customary in the catalytic cracking process for hydrocarbon to regenerate the cracking catalyst deactivated by coke deposition by carbon burning, and reutilize it for cracking reaction. The process according to the present invention can also regenerate the used cracking catalyst and alumina particle by means of the usual regenerative apparatuses and regenerative conditions, and reutilize them. This regeneration is normally carried out at 600°–750° C.

The catalytic cracking process of the present invention is effective when using the relatively high-grade heavy oil, whose metal contaminant content is small, as the feed oil, but it is when catalytic cracking the low-grade heavy oil whose metal contaminant content is high that the profitability of the present invention is most markedly displayed. The process of the present invention permits to obtain gasoline in high yield from the heavy oil whose total metal content is about 50 ppm (in terms of metal). This point will be more detailed. As the alumina particle mingled with the cracking catalyst displays a strong affinity against metals such as vanadium, nickel and the like as compared with crystalline aluminosilicate zeolite, silica, silica-alumina and the like constituting the cracking catalyst, the metals in the feed oil preferentially deposit on the alumina particle and react with alumina while exposed to a high temperature to be deactivated. Due to this, the dehydrogenation reaction caused by deposited metals is retarded, and consequently by-production of coke, hydrogen and other gaseous components is retarded. When the alumina particle contains a phosphorus component, said phosphorus component retards the dehydrogenation activity of metals, in particular the action of nickel whose dehydrogenation activity is especially high, so that by-production of coke, hydrogen and other gaseous components can be retarded sharply as compared with the alumina particle free from said phosphorus component. Viewed from the side of cracking catalyst, whilst, since the phosphorus-containing alumina particle coexists, deposition of metals on said catalyst widely decreases, and thus the catalytic activity inherent in the cracking catalyst can be maintained at a high level for a long period of time.

EXAMPLE 1

[Preparation of cracking catalyst]

A commercially available No. 3 water glass was diluted to obtain a water glass solution having a $SiO_2$ concentration of 12.73 wt%. This water glass solution and a sulfuric acid (concentration: 25%) were poured into the same vessel for 10 minutes at the rates of 20 l/minute and 5.6 l/minute respectively to thereby obtain a silica hydrosol. This silica hydrosol was mingled with kaolin in an amount of 30% based on the weight of the final composition, and was further mingled with a 30 wt% aqueous slurry of a rare earth-exchanged Y type zeolite (exchange rate 67%) so that the amount of zeolite might become 50% based on the weight of the final composition. This mixture was spray-dried, thereafter washed and dried to obtain a cracking catalyst A. This catalyst was found to have an average particle diameter of 57μ and a bulk density of 0.80 g/ml.

[Preparation of alumina particle]

An aluminum hydroxide having an average particle diameter of 70μ produced by Bayer's process was calcined at 550° C. for 3 hours to obtain an alumina particle having a bulk density of 0.76 g/ml and an oil absorption of 0.42 cc/g.

[Catalytic cracking]

The above mentioned cracking catalysts and alumina particles were each sieved so as to remove 55μ or more particles from the cracking particles and 55μ or less particles from the alumina particles. Thereafter, the remainders were each treated at 770° C. for 6 hours in 100% steam, and then calcined at 600° C. for one hour in the air. Thereafter, these cracking catalysts and alumina particles were mingled at a predetermined ratio. By using this particulate mixture, the following catalytic cracking reactions were carried out.

A mixture comprising adding nickel naphthenate and vanadium naphthenate to a desulfurized vacuum gas oil (DSVGO) so that the nickel content and the vanadium content might each become 200 ppm was employed as a feed oil. This feed oil was subjected to 75 seconds' catalytic cracking reaction by employing the reaction conditions: reaction temperature 482° C., weight hourly space velocity 16 hr$^{-1}$, and particulate mixture/feed oil weight ratio 3. Thereafter, the reaction-regeneration operation comprising treating the particulate mixture within the reaction zone at 630° C. for 50 minutes in the air for regeneration and then subjecting same again to the above catalytic cracking reaction was repeated 14 times. The catalytic cracking results obtained in the 15th reaction were valued, and further the amount of metal on the particulate mixture at the time when the 15th reaction had completed were measured. The obtained results are shown in Table 1.

TABLE 1

| Experiment No. | 1 | 2 | 3 | 4 | 5 | 6 |
|---|---|---|---|---|---|---|
| Particle mixing ratio (wt) | | | | | | |
| Cracking catalyst | 100 | 90 | 75 | 50 | 25 | 10 |
| Alumina particle | 0 | 10 | 25 | 50 | 75 | 90 |
| Reaction-results | | | | | | |
| Conversion wt % | 83.1 | 81.7 | 79.1 | 73.6 | 58.6 | 49.3 |
| C$_5$+ gasoline wt % | 52.1 | 54.7 | 56.3 | 52.4 | 39.7 | 35.2 |
| Hydrogen wt % | 0.27 | 0.20 | 0.17 | 0.15 | 0.11 | 0.11 |
| Coke wt % | 5.3 | 4.5 | 4.1 | 3.7 | 2.6 | 2.3 |
| Metal content ppm | | | | | | |
| Cracking catalyst | | | | | | |
| Ni | 993 | 627 | 412 | 250 | 187 | 124 |
| V | 995 | 873 | 743 | 590 | 496 | 329 |
| Alumina particle | | | | | | |
| Ni | — | 4186 | 2733 | 1660 | 1263 | 967 |
| V | — | 2045 | 1741 | 1380 | 1160 | 630 |

*C$_5$+ gasoline: boiling point range C$_5$ - 204° C.

EXAMPLE 2

Catalytic cracking reactions were carried out according to the exactly same conditions and procedure as Example 1 except that the following catalysts were employed in place of the cracking catalyst used in Example 1. The results are shown in Table 2.

[Preparation of cracking catalysts]

Catalysts B, C and D were prepared according to the exactly same procedure as Catalyst A except that kaolin was added to the silica hydrosol so that the kaolin amount might become 52%, 47% and 55% respectively based on the weight of the final composition. And, catalyst E was prepared by adding the rare earth-exchanged Y-type zeolite alone (exclusive of said kaolin) to the silica hydrosol so that said zeolite amount might become 90% based on the weight of the final composition.

TABLE 2

| Experiment NO. | 7 | 8 | 9 | 10 |
|---|---|---|---|---|
| Cracking catalyst | D | B | C | E |
| Zeolite content (%) | 25 | 28 | 33 | 90 |
| Cracking catalyst | 100 | 90 | 75 | 28 |
| Alumina particle (wt ratio) | 0 | 10 | 25 | 72 |
| Zeolite content in particulate mixture (%) | 25 | 25 | 25 | 25 |
| Reaction results | | | | |
| Conversion wt % | 64.3 | 68.3 | 71.8 | 75.1 |
| C$_5$+ gasoline* wt % | 43.6 | 46.5 | 50.2 | 53.4 |
| Hydrogen wt % | 0.26 | 0.20 | 0.18 | 0.14 |
| Coke wt % | 3.5 | 3.9 | 3.8 | 3.7 |
| Metal content ppm | | | | |
| Cracking catalyst | | | | |
| Ni | 993 | 627 | 412 | 198 |
| V | 995 | 873 | 743 | 503 |
| Alumina particle | | | | |
| Ni | — | 4186 | 2733 | 1312 |
| V | — | 2045 | 1741 | 1190 |

*C$_5$+ gasoline: boiling point range C$_5$ - 204° C.

When activity is compared in the manner of unifying the zeolite content in the mixture of the cracking catalyst and the alumina particle, it can be seen from Table 2 that the process of the present invention is little in the lowering of activity because the amount of metal deposit on the cracking catalyst is small.

COMPARATIVE EXAMPLE

A catalytic cracking reaction was carried out according to the exactly same conditions and procedure as Example 1 except that the following silica particle, spent catalyst or silica-alumina particle is employed in place of the alumina particle used in Example 1. The results shown in Table 3 were obtained. The particle mixing ratio was fixed to be 50/50 in every case.

[Silica particle]

An aqueous water glass solution having a SiO$_2$ concentration of 12.73 wt% and a sulfuric acid having a concentration of 25% were mixed to prepare a silica hydrosol. This was spray-dried, thereafter washed and dried, and then calcined at 550° C. for 3 hours to thereby obtain silica particles having an average particle diameter of 70μ and a bulk density of 0.71 g/ml. These silica particles were sieved to remove 55μ or less particles. The remainder was treated at 770° C. for 6 hours in 100% steam, and then calcined at 600° C. for 1 hour in the air. The obtained particles were put to experiment. [Used cracking catalyst]

A cracking catalyst used in a commercial plant (average particle diameter: 75μ, Bulk density: 0.81 g/ml) was calcined at 600° C. for 1 hour, and then put to experiment. This spent catalyst was found to contain 235 ppm of nickel and 438 ppm of vanadium.

[Preparation of silica-alumina particles]

A commercially available No. 3 water glass was diluted to obtain a water glass solution having a SiO$_2$ concentration of 11.2%. Separately, a 10.5% aluminum sulfate solution was prepared. This water glass solution and this aluminum sulfate solution were mingled at the rates of 20 l/minute and 10 l/minute respectively to prepare a gel. This gel was aged at 65° C. for 3.5 hours and stabilized so as to have the pH of 5.8 by adding the water glass. This gel was spray-dried at 220° C., thereafter washed, and dried to prepare silica-alumina particles. These silica-alumina particles were sieved to remove 55μ or less particles. The remainder was treated at 770° C. for 6 hours in 100% steam, and then calcined for 1 hour in the air. The obtained particles were put to experiment.

TABLE 3

| Experiment No. | 11 | 12 | 13 |
| --- | --- | --- | --- |
| Mixed particle | Silica particle | Spent catalyst | Silica-alumina particle |
| Reaction results | | | |
| Conversion wt % | 61.2 | 69.5 | 69.9 |
| $C_5{}^+$ gasoline wt % | 39.7 | 45.2 | 45.8 |
| Hydrogen wt % | 0.14 | 0.25 | 0.22 |
| Coke wt % | 2.7 | 3.8 | 3.8 |
| Metal content ppm | | | |
| Cracking catalyst | | | |
| Ni | 1020 | 992 | 1010 |
| V | 1640 | 997 | 1020 |
| Mixed particle | | | |
| N | 940 | 1225 | 960 |
| V | 360 | 1359 | 955 |

EXAMPLE 3

[Preparation of cracking catalysts]

Cracking catalysts as shown in Table 4 were prepared according to the same procedure as Example 1. The composition and bulk density of each catalyst are shown below. Each catalyst was found to have an average particle diameter of 57μ.

TABLE 4

| Catalyst | A | B | C | D | E |
| --- | --- | --- | --- | --- | --- |
| Composition wt % | | | | | |
| $SiO_2$ | 20 | 20 | 20 | 20 | 10 |
| Kaolin | 30 | 52 | 47 | 55 | 0 |
| Zeolite | 50 | 28 | 33 | 25 | 90 |
| Bulk density g/ml | 0.80 | 0.84 | 0.83 | 0.84 | 0.60 |

[Preparation of phosphorus-containing alumina particles]

An aluminum hydroxide having an average particle diameter of 70μ obtained by Bayer's process was calcined at 550° C. for 3 hours to obtain an alumina particle having a bulk density of 0.76 g/ml, an oil absorption of 0.42 cc/g, and a specific surface area (BET process) of 175 m²/g.

Then, part of this alumina particle was divided into 3 parts, each being 102 g. One part absorbed 40 g of a $H_3PO_4$ aqueous solution having a concentration of 9.7%, another part absorbed 40 g of a $H_3PO_4$ aqueous solution having a concentration of 34%, and the remainder absorbed 40 g of a $H_3PO_4$ aqueous solution having a concentration of 64% respectively. Then, these parts were calcined at 550° C. for 3 hours to obtain the following 3 kinds of phosphorus-containing alumina particles.

TABLE 5

| Phosphorus-containing alumina particle | (1) | (2) | (3) |
| --- | --- | --- | --- |
| P/Al atomic ratio | 0.02 | 0.07 | 0.13 |
| Bulk density g/ml | 0.78 | 0.82 | 0.87 |
| Specific surface area (m²/g) (BET) | 105 | 88 | 65 |

[Catalytic cracking]

A particulate mixture put to a catalyst cracking reaction was handled as follows so that said mixture might be suitably divided into cracking catalysts and phosphorus-containing alumina particles. That is, the above mentioned cracking catalysts and phosphorus-containing alumina particles were each sieved so as to remove 55μ or more particles from the cracking catalysts and 55μ or less particles from the phosphorus-containing alumina particles. Thereafter, the remainders were each treated at 770° C. for 6 hours in 100% steam, and then calcined at 600° C. for 1 hour in the air. Thereafter, one kind of the cracking catalysts and one kind of the phosphorus-containing alumina particles were mingled at a predetermined ratio. By using 4 g of said particulate mixture, the following catalytic cracking reactions were carried out.

A mixture comprising adding nickel naphthenate and vanadium naphthenate to a desulfurized vacuum gas oil (DSVGO) so that the nickel content and the vanadium content might each become 600 ppm was employed as a feed oil. This feed oil was subjected to 75 seconds' catalytic cracking reaction by employing the reaction conditions: reaction temperature 482° C., space velocity 16 hr$^{-1}$, and particulate mixture 1 feed oil weight ratio 3. Thereafter, the reaction-regeneration operation comprising treating the particulate mixture within the reaction zone at 630° C. for 50 minutes in the air for regeneration and then subjecting same again to the above catalytic cracking reaction, was repeated 14 times. The catalytic cracking results obtained in the 15th reaction were valued, and further the metal deposit amount in the particulate mixture at the time when the 15th reaction had completed was measured. The obtained results are shown in Table 6.

The total amount of feed oil supplied up to completion of the 15th reaction was 20 g.

For comparison's sake, furthermore, a catalytic cracking reaction was carried out according to the exactly same conditions and procedure as aforesaid except that the following silica particle, used cracking catalyst or alumina particle (free from phosphorus) was employed in place of the above mentioned phosphorus-containing alumina particle. The results shown in Table 6 were obtained.

[Silica particle]

An aqueous water glass solution having a $SiO_2$ concentration of 12.73 wt% and a sulfuric acid having a concentration of 25% were mixed to prepare a silica hydrosol. This was spray-dried, thereafter washed and dried, and then calcined at 550° C. for 3 hours to obtain silica particles having an average particle diameter 70μ and a bulk density of 0.71 g/ml. These silica particles were sieved to remove 55μ or less particles. The remainder were treated at 770° C. for 6 hours in 100% steam, and thereafter calcined at 600° C. for 2 hours in the air. The obtained particles were put to experiment.

[Used cracking catalyst]

A cracking catalyst used in an actual device (average particle diameter: 75μ, bulk density: 0.81 g/ml) was calcined at 600° C. for 1 hour, and then put to experiment. This used catalyst (represented by SC in Table 3) was found to contain 235 ppm of nickel and 438 ppm of vanadium.

[Alumina particle]

The alumina particles used for the preparation of aforesaid phosphorus-containing alumina particles were sieved as they stand without treating them with an aqueous phosphoric acid solution, thereby removing 55μ or less particles. The remainder was treated at 770° C. for 6 hours in 100% steam and thereafter calcined for 1 hour in the air. The obtained particles were put to experiment.

mentally bad influence on the cracking reaction per se, and rather reduces the metal deposit amount to thereby enhance the conversion rate and the yield of gasoline and reduce the amounts of hydrogen and coke produced.

TABLE 6

| Experiment No. | 1 | 2 | 3 | 4 | 5 | 6 | 7 | 8 | 9 | 10 |
|---|---|---|---|---|---|---|---|---|---|---|
| Cracking catalyst | A | A | A | A | B | C | E | D | A | A |
| Zeolite content (%) | 50 | 50 | 50 | 50 | 28 | 33 | 90 | 25 | 50 | 50 |
| Mixed particle | Alumina | Phosphorus-Alumina | Phosphorus-Alumina | Phosphorus-Alumina | Phosphorus-Alumina | Phosphorus-Alumina | Phosphorus-Alumina | — | Silica | SC |
| P/Al Atomic ratio | 0 | 0.02 | 0.07 | 0.13 | 0.07 | 0.07 | 0.07 | — | | |
| Cracking catalyst | 50 | 50 | 50 | 50 | 90 | 75 | 28 | 100 | 50 | 50 |
| Mixed particle mixing ratio (wt) | 50 | 50 | 50 | 50 | 10 | 25 | 72 | 0 | 50 | 50 |
| Zeolite content in particulate mixture (%) | 25 | 25 | 25 | 25 | 25 | 25 | 25 | 25 | 25 | 25 |
| Reaction results | | | | | | | | | | |
| Conversion wt % | 69.6 | 71.8 | 72.7 | 73.1 | 65.0 | 70.1 | 60.2 | 48.2 | 62.3 | |
| $C_5^+$ gasoline * wt % | 47.2 | 50.7 | 51.8 | 52.1 | 43.9 | 48.3 | 52.9 | 39.5 | 33.1 | 40.8 |
| Hydrogen wt % | 0.30 | 0.25 | 0.23 | 0.20 | 0.44 | 0.28 | 0.18 | 0.51 | 0.48 | 0.57 |
| Coke wt % | 4.4 | 4.0 | 3.9 | 3.8 | 4.3 | 4.1 | 3.7 | 5.1 | 3.1 | 5.5 |
| Metal content ppm | | | | | | | | | | |
| Cracking catalyst | | | | | | | | | | |
| Ni | 755 | 750 | 740 | 735 | 1880 | 1230 | 560 | 2980 | 3070 | 2970 |
| V | 1810 | 1790 | 1760 | 1760 | 2620 | 2230 | 1480 | 2990 | 4880 | 2990 |
| Mixed particle | | | | | | | | | | |
| Ni | 4960 | 4960 | 4980 | 4990 | 12500 | 8200 | 3780 | — | 2820 | 3200 |
| V | 4070 | 4100 | 4100 | 4110 | 6130 | 5220 | 3470 | — | 1090 | 3300 |

* $C_5^+$ gasoline: Boiling Point range $C_5$ - 204° C.

When evaluating the experimental results shown in Table 6, attention should be paid to the fact that each experiment is substantially equal in respect of the total amount of deposit metal. That is, taking the case of Experiment No. 6 wherein the cracking catalyst and the phosphorus-containing alumina particle are mixed in the weight ratio of 75/25, the amount of Ni and V deposited on the cracking catalyst are each calculated from the fact that the total amount of particles contacting with the total 20 g of feed oil is 4 g each experiment of the present Examples as follows: 3 g×1230×10$^{-6}$=3.69 mg and 3 g×2230×10$^{-6}$=6.69 mg. In Experiment No. 6, accordingly, the total sum of nickel deposited is 11.89 mg and the total sum of vanadium deposited is 11.91 mg. These values well coincide with the Ni amount: 4 g×2980×10$^{-6}$=11.92 mg and the V amount: 4 g×2990×10$^{-6}$=11.96 mg in Experiment No. 8 using the cracking catalyst alone.

In Experiment No. 2 wherein the cracking catalyst and the phosphorus-containing alumina particle are mingled in the weight ratio of 50/50, the total sum of nickel deposited and the total sum of vanadium deposited are likewise calculated as follows, and these values well coincide with those of Experiment No. 8.

Ni: 2 g×750×10$^{-6}$+2 g×4960×10$^{-6}$=11.42 mg

V: 2 g×1970×10$^{-6}$+2 g×4100×10$^{-6}$=11.78 mg

This relationship is applicable to other experiments. When attention is paid to the experimental results shown in Table 6 taking this point into consideration, it can be seen that in Experiments 1, 2, 3, 4, 6 and 7 according to the present invention, Ni and V deposit little on the cracking catalyst, and these metals deposit preferentially on the phosphorus-containing alumina. And, it can also be understood from the experimental results of Table 6 that the concurrent use of the phosphorus-containing alumina particle does not exert any experimentally bad influence on the cracking reaction per se,

We claim:

1. A catalytic cracking process for heavy oil containing metallic impurities, which comprises: contacting said heavy oil, under catalytic cracking conditions, with a catalyst composition consisting essentially of a physical admixture of (A) particles of a crystalline aluminosilicate zeolite dispersed in a siliceous matrix, and (B) particles of alumina, the weight ratio of (A)/(B) being in the range of from 75/25 to 25/75, said catalyst composition containing from 20 to 50% by weight of said zeolite, so that the metallic impurities in said heavy oil are preferentially captured by said alumina particles whereby to reduce the production of hydrogen and coke and increase the yield of gasoline.

2. A process as claimed in claim 1 in which the weight ratio of (A)/(B) is at least 50/50.

3. A process as claimed in claim 1 wherein said alumina particles have an average particle diameter of from 20 to 80μ and a bulk density of from 0.60 to 1.20 g/ml, and said catalyst composition contains from 20 to 40% by weight of said zeolite.

4. A catalytic cracking process for heavy oil containing metallic impurities, which comprises: contacting said heavy oil, under catalytic cracking conditions, with a catalyst composition consisting essentially of a physical admixture of (A) particles of a crystalline aluminosilicate zeolite dispersed in a siliceous matrix, and (B) particles of alumina containing phosphorus, the weight ratio of (A)/(B) being in the range of from 75/25 to 25/75, said catalyst composition containing from 20 to 50% by weight of said zeolite, so that the metallic impurities in said heavy oil are preferentially captured by said alumina particles whereby to reduce the production of hydrogen and coke and increase the yield of gasoline.

5. A process as claimed in claim 4 in which the weight ratio of (A)/(B) is at least 50/50.

6. A process as claimed in claim 1 wherein said alumina particles have an average particle diameter of from 20 to 80μ and a bulk density of from 0.60 to 1.20 g/ml, and said catalyst composition contains from 20 to 40% by weight of said zeolite.

7. A process as claimed in claim 4 in which, in said particles (B), the atomic ratio of P to Al is in the range of from 0.01/1 to 0.14/1.

8. A catalytic cracking process for heavy oil containing metallic impurities, which comprises: contacting said heavy oil, under catalytic cracking conditions, with a catalyst composition consisting essentially of a physical admixture of (A) particles of a crystalline aluminosilicate zeolite dispersed in a siliceous matrix, and (B) a mixture of particles of alumina and particles of alumina containing phosphorus, the weight ratio ratio of (A)/(B) being in the range of from 75/25 to 25/75, said catalyst composition containing from 20 to 50% by weight of said zeolite, so that the metallic impurities in said heavy oil are preferentially captured by said alumina particles whereby to reduce the production of hydrogen and coke and increase the yield of gasoline.

9. A process as claimed in claim 8 in which the weight ratio of (A)/(B) is at least 50/50.

10. A process as claimed in claim 8 wherein said alumina particles have an average particle diameter of from 20 to 80μ and a bulk density of from 0.60 to 1.20 g/ml, and said catalyst composition contains from 20 to 40% by weight of said zeolite.

11. A process as claimed in claim 8 in which, in said particles of alumina containing phosphorus, the atomic ratio of P to Al is in the range of from 0.01/1 to 0.14/1.

* * * * *